(12) United States Patent
Yu et al.

(10) Patent No.: US 8,369,648 B2
(45) Date of Patent: Feb. 5, 2013

(54) IMAGE CORRECTION APPARATUS AND IMAGE CORRECTION METHOD

(75) Inventors: Shanshan Yu, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 12/785,659

(22) Filed: May 24, 2010

(65) Prior Publication Data

US 2010/0254623 A1 Oct. 7, 2010

Related U.S. Application Data

(63) Continuation of application No. PCT/JP2007/073594, filed on Dec. 6, 2007.

(51) Int. Cl.
*G06K 9/40* (2006.01)
(52) U.S. Cl. .......................... 382/274; 382/254
(58) Field of Classification Search .................. 382/254, 382/275
See application file for complete search history.

(56) References Cited

U.S. PATENT DOCUMENTS

| | | | |
|---|---|---|---|
| 5,317,427 A * | 5/1994 | Ichikawa | 358/520 |
| 7,158,686 B2 * | 1/2007 | Gindele | 382/274 |

FOREIGN PATENT DOCUMENTS

| | | |
|---|---|---|
| JP | 07-038779 | 2/1995 |
| JP | 7-184054 | 7/1995 |
| JP | 08-009197 | 1/1996 |
| JP | 10-032756 | 2/1998 |
| JP | 2004-134853 | 4/2004 |
| JP | 2004-159344 | 6/2004 |
| JP | 2005-159388 | 6/2005 |
| JP | 2006-013863 | 1/2006 |
| JP | 2007-312313 | 11/2007 |

OTHER PUBLICATIONS

Japanese Office Action issued in corresponding Japanese App. No. 2009-544540, mailed Feb. 28, 2012.
Japanese Office Action and its English translation issued in corresponding Japanese App. No. 2009-544540, mailed Sep. 25, 2012.

* cited by examiner

*Primary Examiner* — Alex Liew
(74) *Attorney, Agent, or Firm* — Greer, Burns & Crain, Ltd.

(57) ABSTRACT

An image correction apparatus calculates a feature value indicative of an average brightness of an input image from the pixel values of the input image and determines a pixel value at a boundary for correcting each pixel of the input image to make it brighter or darker by using the calculated feature value of the input image. The image correction apparatus calculates, with respect to the pixel value of each pixel of the input image, an area for determining a contrast correction amount for a pixel value smaller than the pixel value at the determined boundary such that a pixel is to be made darker and calculates an area for determining a contrast correction amount for a pixel value larger than the pixel value at the determined boundary such that a pixel is to be made brighter, thereby correcting the contrast of the input image by using the calculated areas.

12 Claims, 16 Drawing Sheets

| VARIANCE | 0 TO 2000 | 2001 TO 5000 | 5001 TO 10000 | 10001 TO 20000 | 20001 TO 40000 | EQUAL TO OR MORE THAN 40001 |
|---|---|---|---|---|---|---|
| ALPHA VALUE | 1.8 | 1.6 | 1.4 | 1.3 | 1.2 | 1.1 |
| BETA VALUE | 0.56 | 0.63 | 0.71 | 0.77 | 0.83 | 0.91 |

FIG.5A $$\text{INFLECTION POINT} = \begin{cases} Th1 & \text{AVERAGE LIGHTNESS} < Th1 \\ \text{AVERAGE LIGHTNESS} & Th1 \leq \text{AVERAGE LIGHTNESS} \leq Th2 \\ Th2 & \text{AVERAGE LIGHTNESS} > Th2 \end{cases}$$

$$0 \leq Th1 \leq Th2 \leq 255$$

FIG.6A $$\text{INFLECTION POINT} = \begin{cases} Th1 + (128 - Th1)\left(\dfrac{AVERAGE\ LIGHTNESS}{128}\right)^{\alpha} & AVERAGE\ LIGHTNESS < 128 \\ 128 + (Th2 - 128)\left(\dfrac{AVERAGE\ LIGHTNESS - 128}{128}\right)^{\beta} & AVERAGE\ LIGHTNESS \geq 128 \end{cases}$$

$$0 \leq Th1 < 128 < Th2 \leq 255,\ \alpha > 1, 0 < \beta < 1$$

FIG.7A $$y = \begin{cases} INFLECTION\ POINT \cdot \left(\dfrac{x}{INFLECTION\ POINT}\right)^{\alpha} & x \leq INFLECTION\ POINT \\ INFLECTION\ POINT + (255 - INFLECTION\ POINT)\left(\dfrac{x - INFLECTION\ POINT}{255 - INFLECTION\ POINT}\right)^{\beta} & x > INFLECTION\ POINT \end{cases}$$

CORRECTION CURVE

IMAGE CORRECTION APPARATUS AND IMAGE CORRECTION METHOD

CROSS-REFERENCE TO RELATED APPLICATION(S)

This application is a continuation of International Application No. PCT/JP2007/073594, filed on Dec. 6, 2007, the entire contents of which are incorporated herein by reference.

FIELD

The embodiments discussed herein are directed to an image correction apparatus and an image correction method for correcting the contrast of an input image.

BACKGROUND

Conventional contrast correction is performed as a color correction for an original image with high quality regardless of whether the images are moving images or still images. Contrast correction is correction performed to make dark areas of an image darker and bright areas thereof brighter so as to emphasize image contrast, whereby a sharper image is obtained.

For such contrast correction, correction is typically performed by focusing on the maximum point and the minimum point of pixel values of the image (black and white areas), and in recent years, correction has been performed by using an S-curve in order to correct the image by emphasizing contrast and improving sharpness. With the correction using an S-curve, an area of the image to be made darker and an area thereof to be made brighter can be determined by adjusting the inflection point of the S-curve. For contrast correction using the S-curve, various technologies are disclosed for determining the inflection point in order to correct an image by emphasizing contrast and improving sharpness.

For example, Japanese Laid-open Patent Publication No. 2006-13863 discloses an image correction apparatus that detects the maximum value and the minimum value from each line constituting an input image and determines the inflection point of an S correction curve by using the intermediate value of these values, or determines the inflection point by determining the average intermediate value from the average of the maximum values of respective lines in a block and the average of the minimum values of the respective lines.

Furthermore, Japanese Laid-open Patent Publication No. 08-009197 discloses an image correction apparatus that uses a histogram of luminance signals of an input image corresponding to one screen and, if a white/black level range in the histogram is small, determines the inflection point of an S correction curve using the difference between the lowest frequency in the white/black level range and the reference frequency.

Moreover, Japanese Laid-open Patent Publication No. 07-38779 discloses an image correction apparatus for which a plurality of gamma correction curves is prepared, a correction curve is selected in accordance with the peak luminance of an input image, and the input image is then corrected using the selected correction curve.

The above-described conventional technologies have a problem in that an inflection point is not accurately determined because of the significant effect of noise and, as a result, the accuracy of the contrast correction can be reduced.

Specifically, in conventional technology, because the maximum value and the minimum value in an image or a line are detected so that an inflection point is determined by using the intermediate value of the maximum value and the minimum value, there is an effect of the maximum value or the minimum value (it can be noise) that is present on a small portion of the image or line; therefore, there is likely to be an effect of noise. Further, if there is a deviation of pixel values of an image (if the mode is different from the median), in correction according to the above-described technologies, a pixel for which the correction is not originally needed is corrected too much and an unnatural output image can be produced.

For example, although original images illustrated in FIGS. 14A and 14B are substantially the same, a local area of the original image illustrated in FIG. 14B is darker than the original image illustrated in FIG. 14A. If contrast correction is performed using a conventional method in the above case, because the inflection point of a correction curve is calculated from the feature value of the local point, the corrected images are considerably different from each other even though the original images are almost the same, and at least either one of them has low image quality and the contrast correction performance is not sufficient.

SUMMARY

According to an aspect of an embodiment of the invention, an image correction apparatus for correcting contrast of an input image includes a feature-value calculating unit that calculates a feature value indicative of average brightness of the input image from pixel values of pixels of the input image; a boundary determining unit that determines a pixel value at a boundary for correcting each pixel of the input image to make the pixel brighter or darker by using the feature value of the input image calculated by the feature-value calculating unit; and a correction-amount calculating unit that calculates, with respect to the pixel value of each pixel of the input image, an area for determining a contrast correction amount for a pixel value smaller than the pixel value at the boundary determined by the boundary determining unit such that a pixel is to be made darker, and an area for determining a contrast correction amount for a pixel value larger than the pixel value at the boundary determined by the boundary determining unit such that a pixel is to be made brighter.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 5A and 5B are representations that illustrate an example of calculation of an inflection point;

FIGS. 6A and 6B are representations that illustrate an example of calculation of an inflection point;

FIGS. 7A and 7B are representations that illustrate an example of calculation of a correction curve line;

DESCRIPTION OF EMBODIMENTS

Preferred embodiments of the present invention will be explained with reference to accompanying drawings. In the following descriptions, explanations are given, in the following order, of the main term used in the present embodiment, the summary and characteristics of the image correction apparatus according to the present embodiment, the configuration and procedure of the image correction apparatus, and finally various modified examples of the present embodiment.

[a] First Embodiment

Explanation of Term

First, an explanation is given of the main term used in the present embodiment. An "image correction apparatus" means an apparatus that receives an input image, such as a moving image or a still image, from an external device via a network and corrects the received input image in accordance with a correction amount that is calculated from the input image so as to correct the input image with a high quality. An input image can be received by a method not only via a network but also from a computer readable recording medium, such as a hard disk, a flexible disk (FD), a CD-ROM, an MO, or a DVD.

Summary and Characteristics of the Image Correction Apparatus

Figure 1:
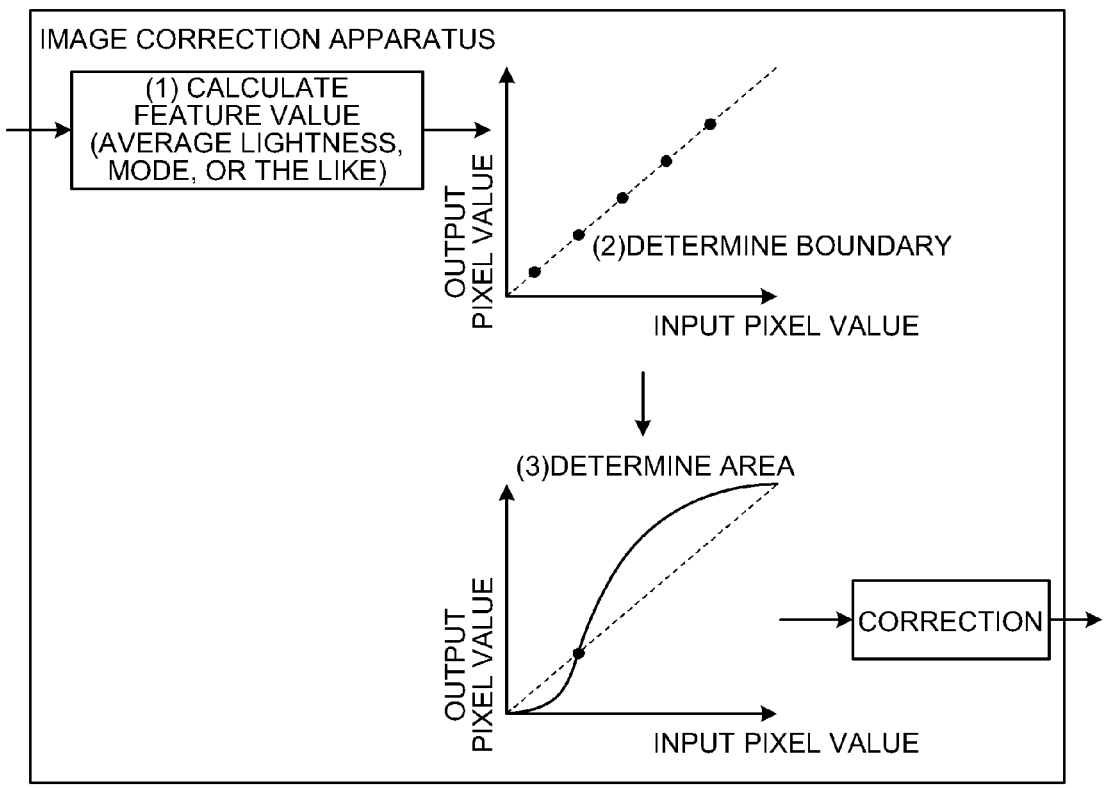
FIG. 1 is a diagram that explains the summary and characteristics of an image correction apparatus according to the first embodiment.

An explanation is given of the summary and characteristics of an image correction apparatus according to a first embodiment with reference to FIG. 1. FIG. 1 is a diagram that explains the summary and characteristics of the image correction apparatus according to the first embodiment.

As illustrated in FIG. 1, a summary of the image correction apparatus is that the contrast of an input image is corrected so as to generate an image with a high image quality and, in particular, a primary characteristic is that a contrast correction with high accuracy can be performed.

The following is a detailed explanation of the main characteristic: the image correction apparatus calculates a feature value indicative of the average brightness of the input image from the pixel value of each pixel of the input image (see (1) in FIG. 1). A specific example would be that the image correction apparatus refers to each pixel of the input image corresponding to one frame and calculates the pixel value (lightness, luminance) of each pixel, thereby calculating the feature value indicative of the average brightness of the input image from the calculated pixel values. For example, upon receiving an input image having five million pixels, the image correction apparatus calculates the pixel value (lightness, luminance) of each of the five million pixels, thereby calculating the feature value (for example, the average lightness, the mode, or the like) indicative of the average brightness.

The image correction apparatus then determines a pixel value at a boundary in order to correct each pixel of the input image to make it brighter or darker in accordance with the calculated feature value of the input image (see (2) in FIG. 1). A specific example would be that the image correction apparatus compares the average lightness, the mode, or the like, which is the calculated feature value of the input image, with a preset threshold so as to determine a pixel value at a boundary in order to correct each pixel of the input image to make it brighter or darker. For example, if a correction curve line (S-curve, correction curve) is used to determine a contrast correction amount, the image correction apparatus compares the average lightness, the mode, or the like, which is the calculated feature value of the input image, with a preset threshold so as to determine, as a pixel value at a boundary in order to correct each pixel of the input image to make it brighter or darker, the position of the inflection point of a correction curve line that is present at a position on the line that defines the output pixel value "0" for the input pixel value "0".

The image correction apparatus then calculates, with respect to the pixel value of each pixel of the input image, an area for determining a contrast correction amount for a pixel value smaller than the pixel value at the determined boundary such that a pixel is to be made darker and calculates an area for determining a contrast correction amount for a pixel value larger than the pixel value at the determined boundary such that a pixel is to be made brighter (see (3) in FIG. 1). A specific example would be that the image correction apparatus determines, with respect to the pixel value of each pixel of the input image, an area for determining a contrast correction amount for a pixel value smaller than the pixel value at the determined boundary such that a pixel is to be made darker by using an exponential function, or the like, and determines an area for determining a contrast correction amount for a pixel value larger than the pixel value at the determined boundary such that a pixel is to be made brighter by using an exponential function, or the like.

Afterwards, the image correction apparatus determines a corrected pixel value corresponding to each pixel of the input image by using the area, such as a correction curve line, generated in (3) of FIG. 1 for determining a contrast correction amount, thereby correcting the contrast of the entire input image.

Thus, the image correction apparatus according to the first embodiment can flexibly vary the boundary (or the inflection point) of the area (or the correction curve line) for determining a contrast correction amount in accordance with the lightness of the input image, control separation of a dark section and a bright section of the input image for sharpness correction and, as a result, perform contrast correction with high accuracy as described above as the main characteristic.

Configuration of the Image Correction Apparatus

Figure 2:
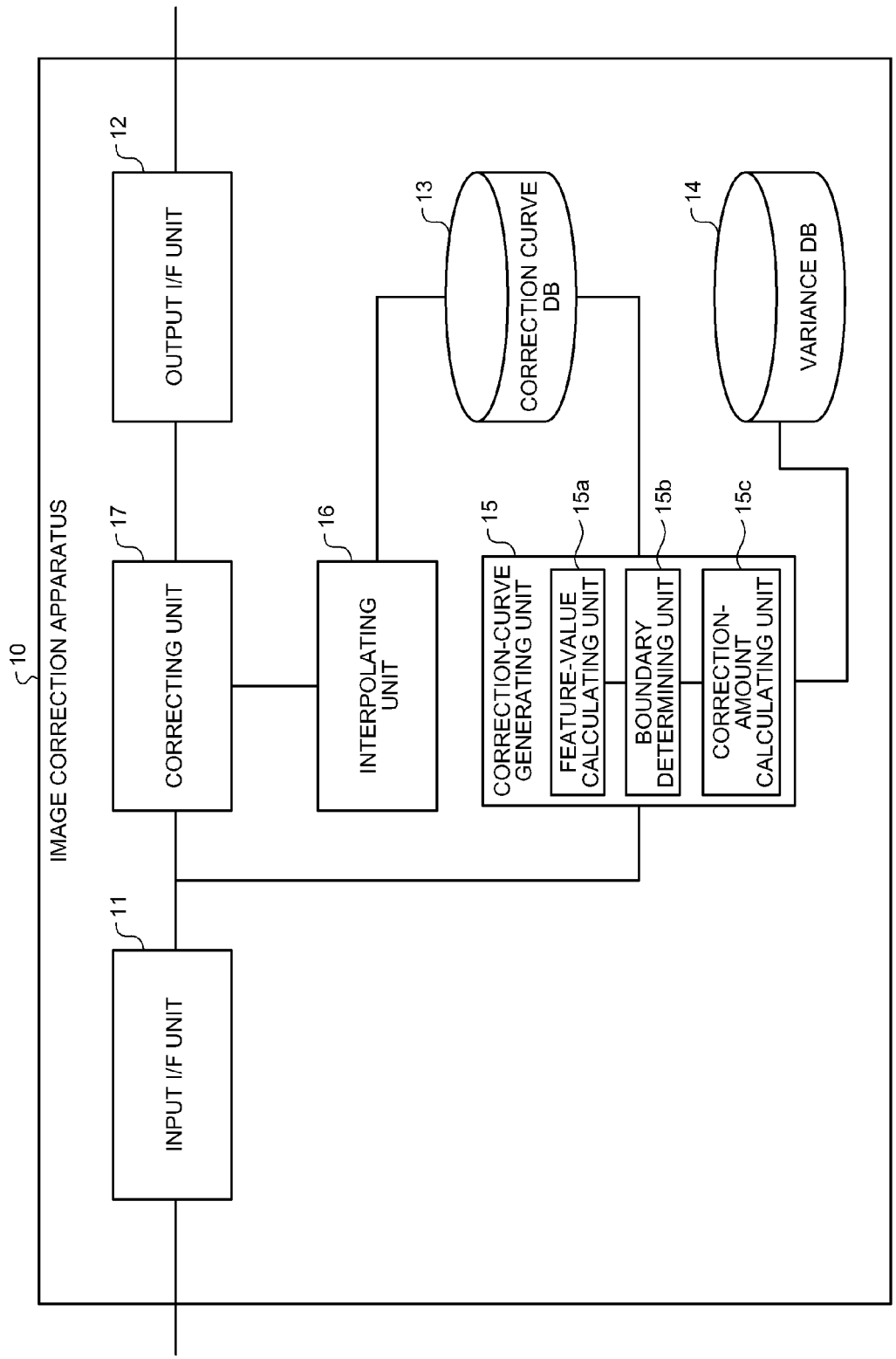
FIG. 2 is a block diagram that illustrates the configuration of the image correction apparatus according to the first embodiment.

Next, an explanation is given of the configuration of the image correction apparatus illustrated in FIG. 1 with reference to FIG. 2. FIG. 2 is a block diagram that illustrates the configuration of the image correction apparatus according to the first embodiment. As illustrated in FIG. 2, an image correction apparatus 10 is constituted by an input I/F unit 11, an output I/F unit 12, a correction curve DB 13, a variance DB 14, a correction-curve generating unit 15, an interpolating unit 16, and a correcting unit 17.

The input I/F unit 11 receives an input image from outside, a storage medium, or the like. A specific example would be that the input I/F unit 11 is connected to the correction-curve generating unit 15 and the correcting unit 17 that are explained later, receives an input image frame-by-frame from outside, a storage medium, or the like, and outputs it to each of the connected correction-curve generating unit 15 and the connected correcting unit 17.

The output I/F unit 12 outputs a corrected output image to various apparatuses connected thereto. A specific example would be that the output I/F unit 12 is connected to the correcting unit 17 that is explained later, receives an image that has undergone contrast correction from the correcting unit 17, and outputs it to a range correction apparatus that performs range correction or to an image processing apparatus that performs various types of image processing.

Figures 3, 4:
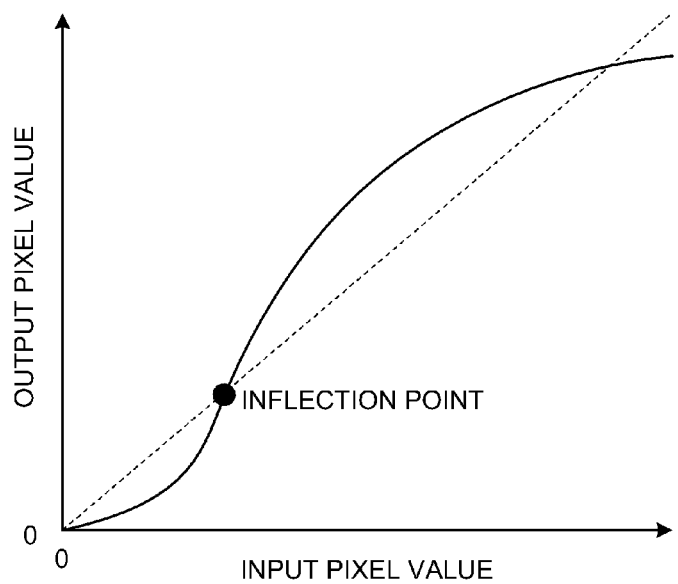
FIG. 3 is a graph that illustrates an example of information stored in a correction curve DB.
FIG. 4 is a table that illustrates an example of information stored in a variance DB.

The correction curve DB 13 stores therein an area for determining a contrast correction amount for the input image. A specific example would be that the correction curve DB 13 is connected to the correction-curve generating unit 15 and to the interpolating unit 16 and stores therein an S-curve that is a correction curve generated by the correction-curve generating unit 15, as illustrated in FIG. 3. The correction curve stored in the correction curve DB 13 relates a pixel value to be output (corrected) to each pixel of the input image received by the input I/F unit 11. FIG. 3 is a graph that illustrates an example of information stored in the correction curve DB.

The variance DB 14 stores therein variance to be used for determining a pixel value at a boundary in order to correct each pixel of the input image to make it brighter or darker. A specific example would be, as illustrated in FIG. 4, that the variance DB 14 stores therein a previously calculated "alpha value" and "beta value" that indicate parameters of an exponential function to be used for calculating an inflection point, wherein the "alpha value" and the "beta value" are linked to the total number of all the pixel values of the input image received by the input I/F unit 11, i.e., "variance" indicative of the variance of the input image. For example, the variance DB 14 stores therein "0 to 2000, 1.8, 0.56", "10001 to 20000, 1.3, 0.77", and the like, as "variance, alpha value, beta value". The variance DB 14 is not a fundamental processing unit; therefore, a correction curve can be calculated by using only an exponent function. FIG. 4 is a table that illustrates an example of information stored in the variance DB.

The correction-curve generating unit 15 is a processing unit that calculates, with respect to the pixel value of each pixel of the input image, an area for determining a contrast correction amount such that a pixel is to be made darker and an area for determining a contrast correction amount such that a pixel is to be made brighter and includes, as units especially closely associated with the present invention, a feature-value calculating unit 15a, a boundary determining unit 15b, and a correction-amount calculating unit 15c.

The feature-value calculating unit 15a calculates the feature value indicative of the average brightness of the input image from the pixel value of each pixel of the input image. A specific example would be that the feature-value calculating unit 15a refers to each pixel of the input image corresponding to one frame received by the input I/F unit 11 so as to calculate the pixel value (lightness, luminance) of each pixel, calculates the average lightness or the mode as the feature value indicative of the average brightness of the input image from the calculated pixel values, and then outputs it to the boundary determining unit 15b, which is described later. For example, upon receiving an input image having 5 million pixels, the feature-value calculating unit 15a calculates the pixel value (lightness, luminance) of each of the 5 million pixels so as to calculate the average lightness or the mode as the feature value indicative of the average brightness and then outputs it to the boundary determining unit 15b.

The boundary determining unit 15b determines a pixel value at a boundary in order to correct each pixel of the input image to make it brighter or darker in accordance with the calculated feature value of the input image. A specific example would be that the boundary determining unit 15b determines the inflection point of a correction curve line as a pixel value at a boundary in order to correct each pixel of the input image to make it brighter or darker in accordance with the average lightness or the mode of the input image calculated by the feature-value calculating unit 15a.

Figure 5B:
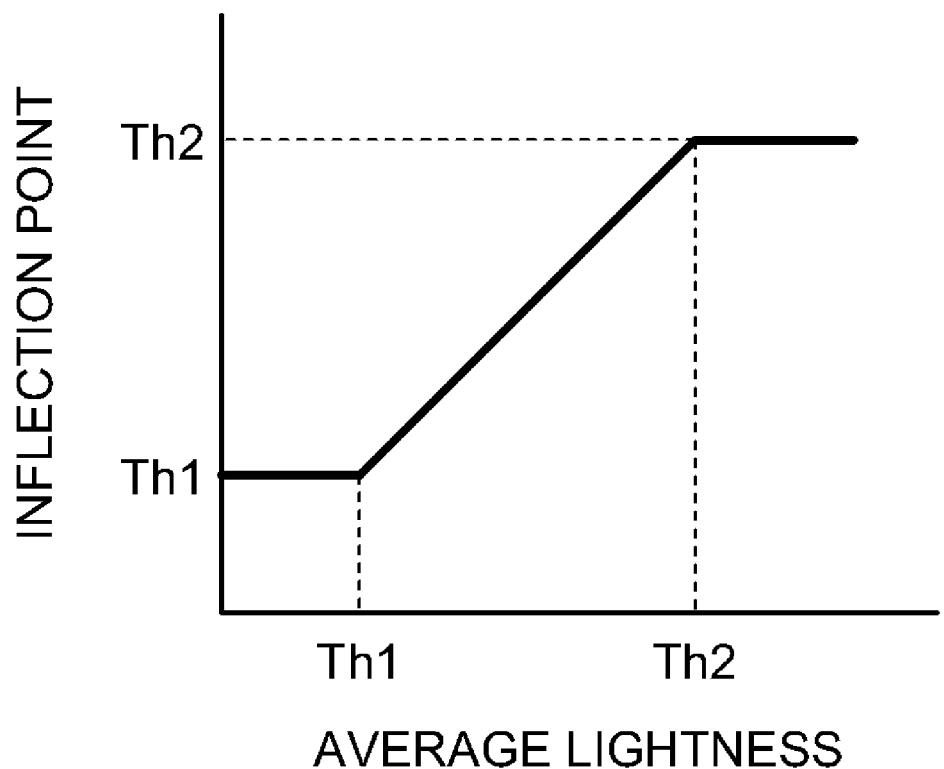

For example, as illustrated in FIG. 5A, the boundary determining unit 15b determines an inflection point by comparing the average lightness of the input image calculated by the feature-value calculating unit 15a with thresholds (Th1, Th2). In this case, as illustrated in FIG. 5B, the boundary determining unit 15b determines "Th1" as an inflection point if the average lightness of the input image calculated by the feature-value calculating unit 15a is less than the threshold (Th1), determines the calculated average lightness as an inflection point if the average lightness is more than the threshold (Th1) and less than the threshold (Th2), and determines "Th2" as an inflection point if the average lightness is more than the threshold (Th2).

Figure 6B:
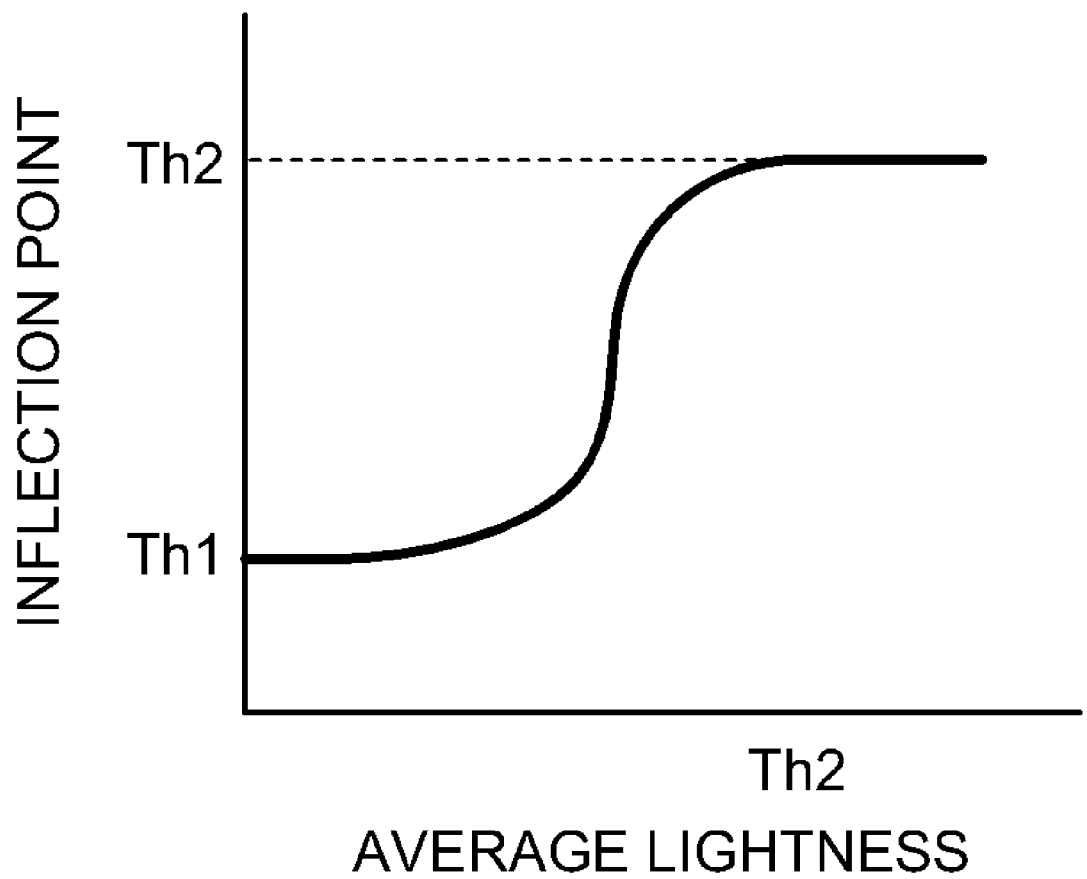

For example, as illustrated in FIG. 6A, the boundary determining unit 15b can determine an inflection point by using the average lightness of the input image calculated by the feature-value calculating unit 15a and the variance stored in the variance DB 14. In this case, the boundary determining unit 15b calculates the variance of the input image and, if the average lightness of the input image calculated by the feature-value calculating unit 15a is less than "128", acquires the parameter "alpha" corresponding to the calculated variance from the variance DB 14 so as to calculate an inflection point, as illustrated in FIGS. 6A and 6B. If the average lightness of the input image calculated by the feature-value calculating unit 15a is more than "128", as illustrated in FIG. 6A, the boundary determining unit 15b acquires the parameter "beta" corresponding to the calculated variance from the variance DB 14 so as to calculate an inflection point. FIGS. 5A, 5B, 6A, and 6B are representations that illustrate examples of the calculation of an inflection point.

With respect to the pixel value of each pixel of the input image, the correction-amount calculating unit 15c calculates an area for determining a contrast correction amount for a pixel value smaller than the pixel value at the boundary determined by the boundary determining unit 15b such that a pixel is to be made darker and calculates an area for determining a contrast correction amount for a pixel value larger than the pixel value at the boundary determined by the boundary determining unit 15b such that a pixel is to be made brighter. A specific example would be, with respect to the pixel value of each pixel of the input image, that the correction-amount calculating unit 15c calculates a correction curve line as an area for determining a contrast correction amount for a pixel value that is below the inflection point at the boundary determined by the correction-amount calculating unit 15c such that a pixel is to be made darker and for a pixel value that is above the inflection point at the boundary determined by the correction-amount calculating unit 15c such that a pixel is to be made brighter, and then stores the correction curve line in the correction curve DB 13. At that time, if the variance calculated by the boundary determining unit 15b is large, the correction-amount calculating unit 15c calculates a correction curve line with a large degree of curvature and, if the variance calculated by the boundary determining unit 15b is small, calculates a correction curve line with a small degree of curvature.

Figure 7B:
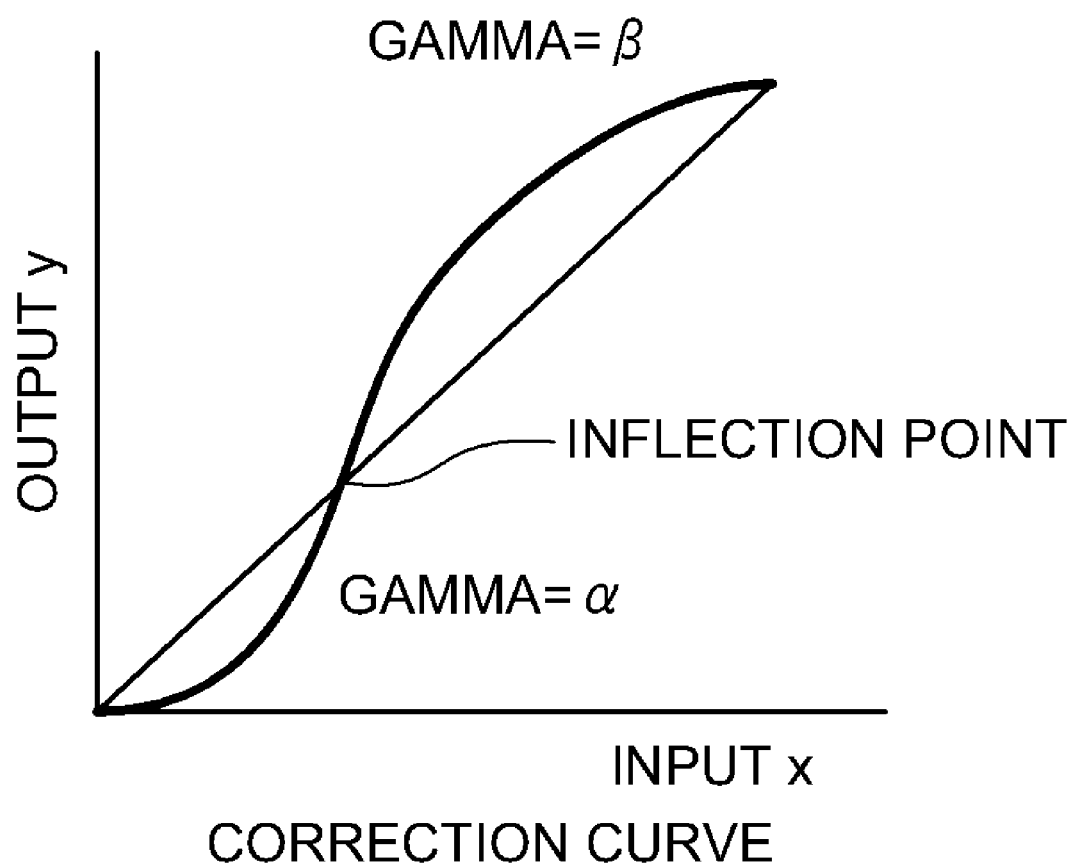

For example, the correction-amount calculating unit 15c uses the calculation formula illustrated in FIG. 7A that uses the inflection point, which is calculated by the boundary determining unit 15b, and the parameters (the alpha value and the beta value), which are acquired from the variance DB 14 and correspond to the variance of the input image calculated by the boundary determining unit 15b, and, as illustrated in FIG. 7B, by using the inflection point calculated by the boundary determining unit 15b as a boundary, the correction-amount calculating unit 15c determines a "gamma=α" curve line for a pixel value that is below the inflection point such that a pixel is to be made darker and a "gamma=β" curve line for a pixel value that is above the inflection point such that a pixel is to be made brighter. FIGS. 7A and 7B are representations that illustrate an example of the calculation of a correction curve line.

The interpolating unit 16 interpolates the correction curve calculated by the correction-amount calculating unit 15c. A specific example would be that, basically, a correction curve is generated for each input image corresponding to one frame received by the input I/F unit 11 and then contrast correction is performed. For faster processing, if a correction curve is generated for every 10 frames and contrast correction is performed, the interpolating unit 16 refers to a correction curve stored in the correction curve DB 13 and, before a subsequent correction curve is stored between the second frame and the ninth frame, performs an interpolation process, such as linear interpolation, on the correction curve generated for a previous frame (for example, the correction curve generated for the first frame if the frame to be processed is the second frame, the correction curve generated for the sixth frame if the frame to be processed is the seventh frame), thereby outputting the correction curve that has undergone the interpolation process to the correcting unit 17, which is described later. The interpolating unit 16 is not a fundamental processing unit; therefore, contrast correction may be performed by using a correction curve generated each time for each input image.

The correcting unit 17 determines a contrast correction amount corresponding to each pixel of the input image by using the area or the correction curve line calculated by the interpolating unit 16 and corrects each pixel by using the determined contrast correction amount. A specific example would be that the correcting unit 17 calculates the corrected pixel value (output pixel value) that corresponds to the pixel value of each pixel of the input image of one frame received by the input I/F unit 11 by using the correction curve input from the interpolating unit 16 so as to perform contrast correction on the received input image, and then outputs the result to the output I/F unit 12.

Processing Performed by the Image Correction Apparatus

Figure 8:
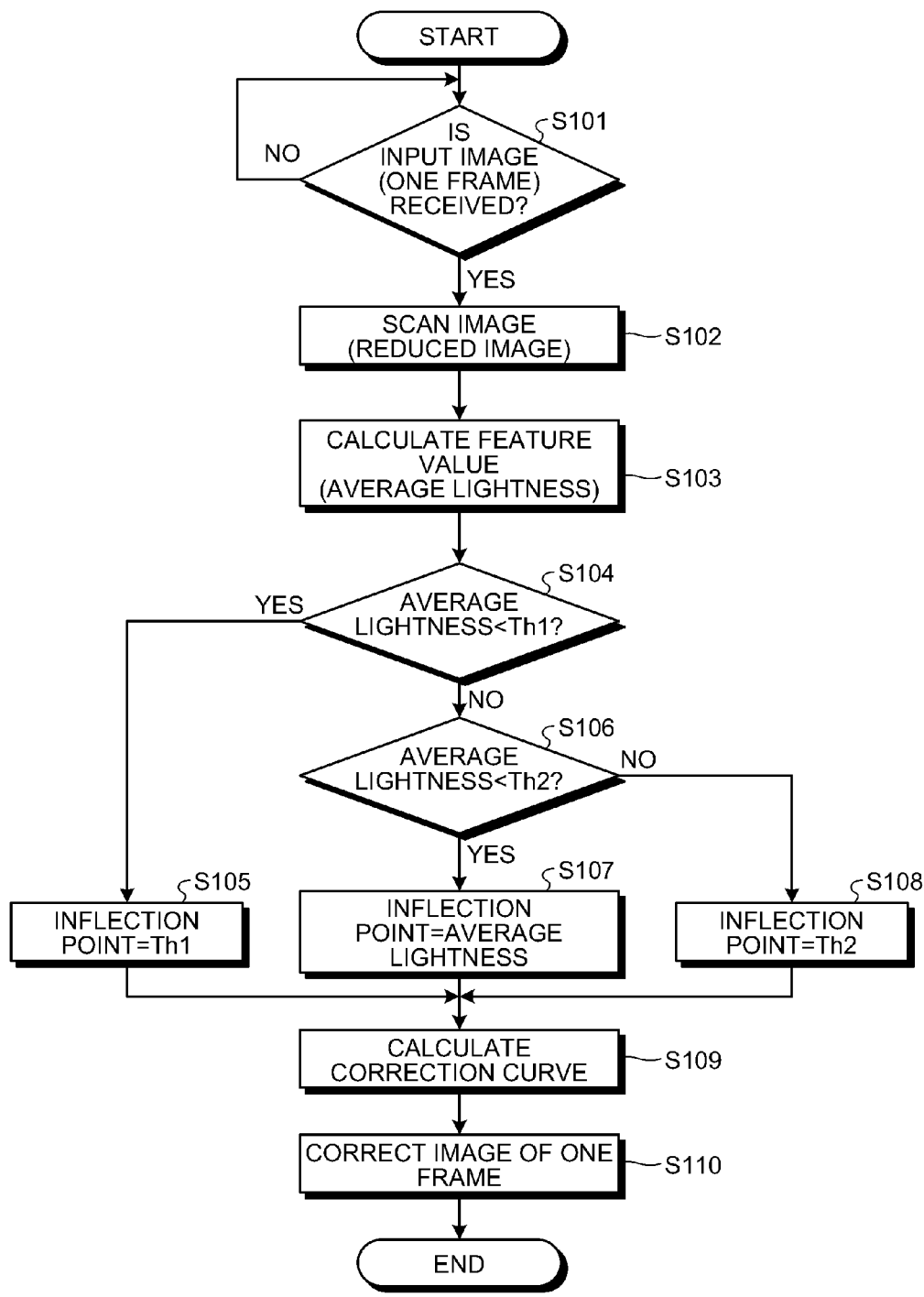
FIG. 8 is a flowchart that illustrates the procedure of a contrast correction process performed by the image correction apparatus according to the first embodiment.

Next, an explanation is given of processing performed by the image correction apparatus with reference to FIG. 8. FIG. 8 is a flowchart that illustrates the procedure of the contrast correction process performed by the image correction apparatus according to the first embodiment.

As illustrated in FIG. 8, when an input image is received by the input I/F unit 11 (Yes at Step S101), the feature-value calculating unit 15a in the image correction apparatus 10 scans each pixel of the input image (Step S102).

The feature-value calculating unit 15a then calculates the average lightness as the feature value indicative of the average brightness of the input image from the pixel value of each pixel of the input image (Step S103). Not only the average value of lightness but also the mode, or the like, may be calculated as a feature value as long as it indicates a feature to discriminate input images.

The boundary determining unit 15b in the image correction apparatus 10 then determines whether the average lightness calculated by the feature-value calculating unit 15a is smaller than the threshold "Th1" (Step S104). If the calculated average lightness is smaller than the threshold "Th1" (Yes at Step S104), the boundary determining unit 15b determines the threshold "Th1" as an inflection point (Step S105).

If the calculated average lightness is larger than the threshold "Th1" (No at Step S104), the boundary determining unit 15b determines whether the calculated average lightness is smaller than the threshold "Th2" (Step S106).

If the calculated average lightness is smaller than the threshold "Th2" (Yes at Step S106), the boundary determining unit 15b determines the calculated "average lightness" as an inflection point (Step S107) and, if the calculated average lightness is larger than the threshold "Th2" (No at Step S106), the boundary determining unit 15b determines the threshold "Th2" as an inflection point (Step S108). The process from Steps S104 to S108 is explained using the method illustrated in FIGS. 5A and 5B as an example; however, the present invention is not limited thereto and the method illustrated in FIGS. 6A and 6B may also be used.

Afterward, with respect to the pixel value of each pixel of the input image, the correction-amount calculating unit 15c calculates a correction curve line as an area for determining a contrast correction amount such that a pixel is to be made darker for a pixel value that is below the inflection point at the boundary determined by the correction-amount calculating unit 15c and such that a pixel is to be made brighter for a pixel value that is above the inflection point at the boundary determined by the correction-amount calculating unit 15c, and then stores the correction curve line in the correction curve DB 13 (Step S109).

The interpolating unit 16 then refers to a correction curve stored in the correction curve DB 13 and notifies the correcting unit 17 of the correction curve that is interpolated as appropriate, and the correcting unit 17 determines a contrast correction amount corresponding to each pixel of the input image by using the area or the correction curve line calculated by the interpolating unit 16 and corrects each pixel by using the determined contrast correction amount (Step S110). An interpolation process is not necessarily performed in the process at Step S109.

Advantage of First Embodiment

Thus, according to the first embodiment, the feature value indicative of the average brightness of the input image is calculated from the pixel value of each pixel of the input image, the pixel value at a boundary in order to correct each pixel of the input image to make it brighter or darker is determined by using the calculated feature value of the input image, and, with respect to the pixel value of each pixel of the input image, an area for determining a contrast correction amount for a pixel value smaller than the pixel value at the determined boundary such that a pixel is to be made darker is calculated and an area for determining a contrast correction amount for a pixel value larger than the pixel value at the determined boundary such that a pixel is to be made brighter is calculated, whereby contrast correction can be performed with high accuracy.

Furthermore, according to the first embodiment, the average lightness or the mode is calculated as the feature value indicative of the average brightness of the input image from the pixel value of each pixel of the input image, the inflection point of a correction curve line is determined as the pixel value at a boundary in order to correct each pixel of the input image to make it brighter or darker by using the calculated average lightness or mode of the input image, and, with respect to the pixel value of each pixel of the input image, a correction curve line is calculated as an area for determining a contrast correction amount for a pixel value that is below the inflection point at the determined boundary such that a pixel is to be made darker and for a pixel value that is above the inflection point at the determined boundary such that a pixel is to be made brighter, whereby a correction amount can be determined in accordance with the brightness of the input image and, as a result, contrast correction can be performed with accuracy.

According to the first embodiment, if the calculated average lightness or mode of the input image is equal to or less than a first threshold, the first threshold is determined as an inflection point, if the average lightness or the mode is larger than the first threshold and smaller than a second threshold, the average lightness or the mode is determined as an inflection point and, if the average lightness or the mode is equal to or larger than the second threshold, the second threshold is determined as an inflection point, whereby it is possible to prevent calculation of an unbalanced correction curve line in which pixels are too dark or too bright and, as a result, to perform contrast correction with accuracy.

According to the first embodiment, the variance of the input image is further calculated and, if the calculated variance is large, a correction curve line with a large degree of curvature is calculated and, if the calculated variance is small, a correction curve line with a small degree of curvature is calculated, whereby proper contrast correction can be performed in accordance with the lightness (luminance) of the entire input image.

According to the first embodiment, a contrast correction amount corresponding to each pixel of the input image is determined by using the calculated area or correction curve line, and each pixel is corrected by using the determined contrast correction amount, whereby contrast correction can be performed with high accuracy.

[b] Second Embodiment

Although an explanation is given in the first embodiment for the case where the correction curve is calculated using an exponent function and using the inflection point calculated from each pixel value of the input image as a boundary, the present invention is not limited thereto and a correction curve can be calculated by using various methods other than an exponent function.

Figure 9:
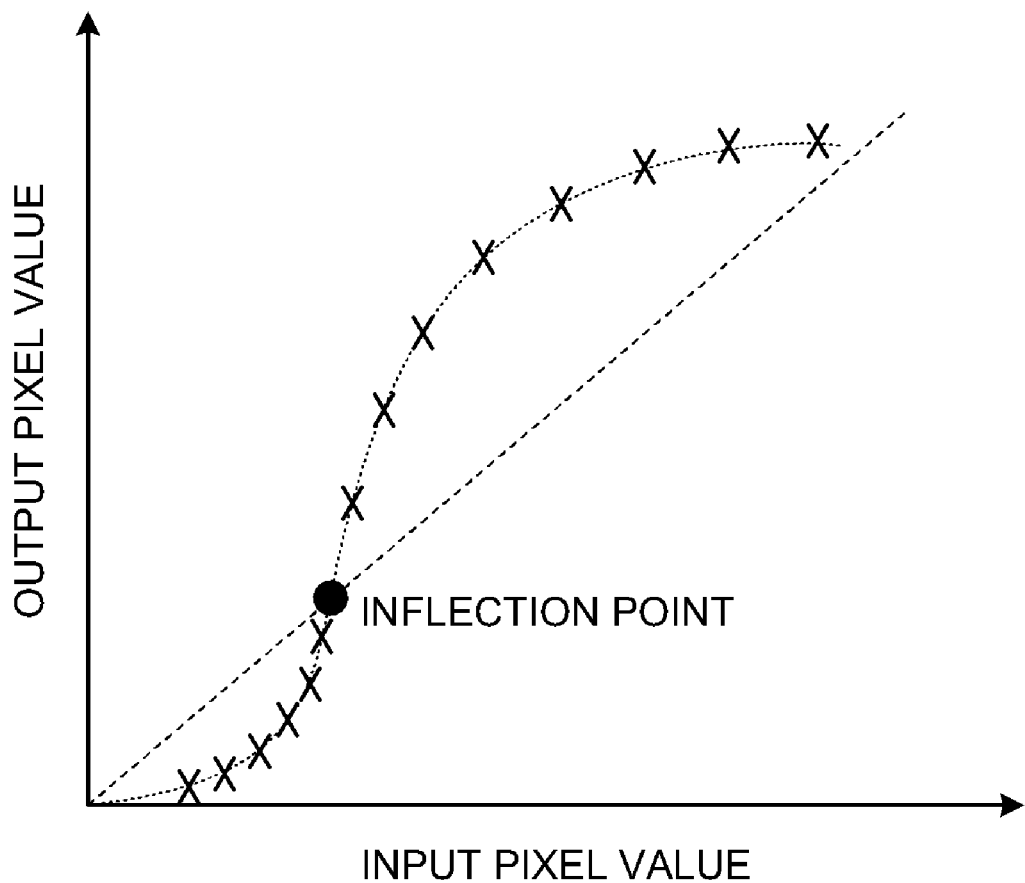
FIG. 9 is a graph that illustrates an example of calculation of a correction curve line by spline interpolation.

For example, as illustrated in FIG. 9, a correction curve can be calculated by spline interpolation after an inflection point is calculated. The spline interpolation may be a linear spline curve obtained by assigning numbers to a plurality of points on a plane and connecting respective points (knots) by a liner line or may be a cubic spline curve obtained by connecting respective knots by using a cubic function. FIG. 9 is a graph that illustrates an example of calculation of a correction curve line using spline interpolation.

Figure 10A:
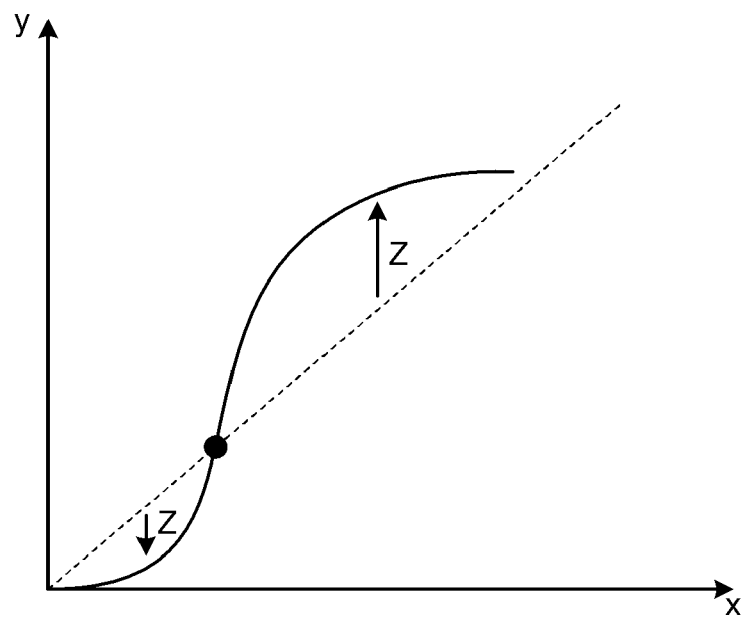
FIGS. 10A and 10B are graphs that illustrate an example of calculation of a correction curve line.
Figure 10B:
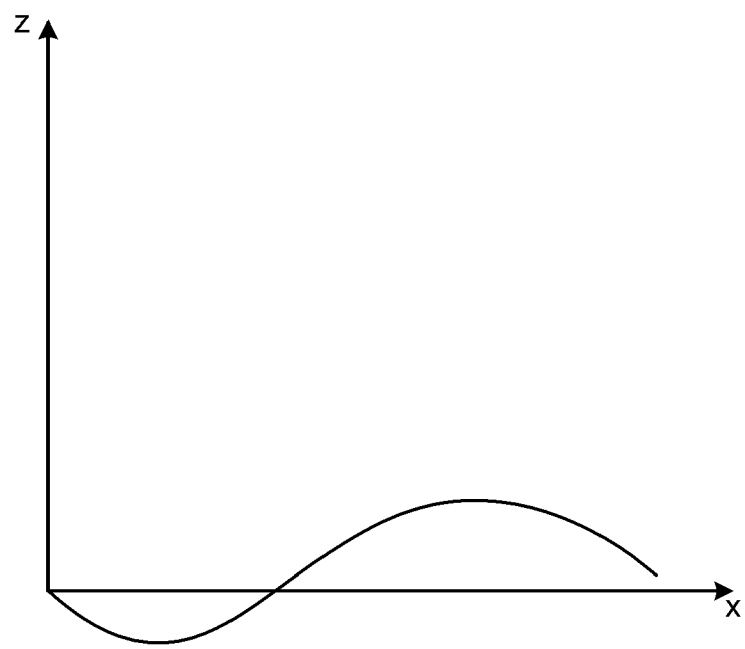
Figure 11A:
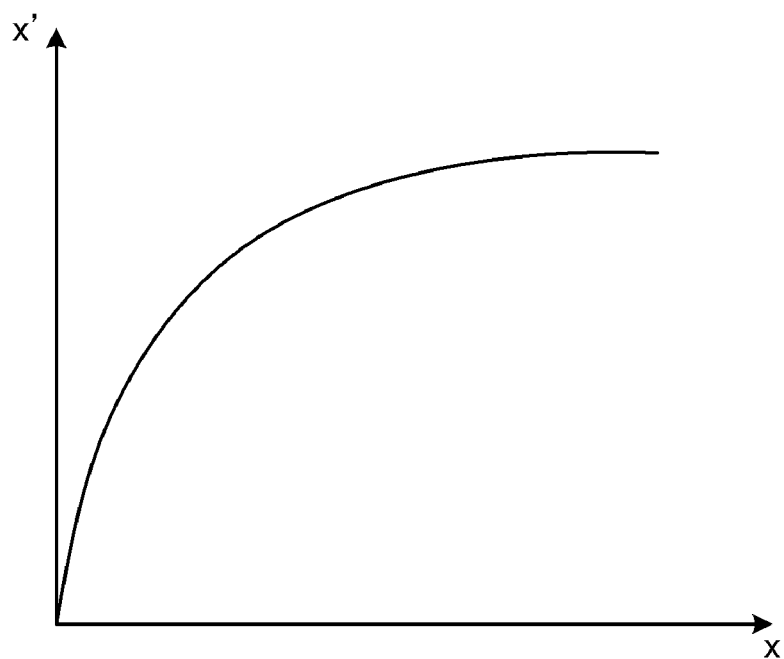
FIGS. 11A and 11B are graphs that illustrate an example of calculation of a correction curve line.
Figure 11B:
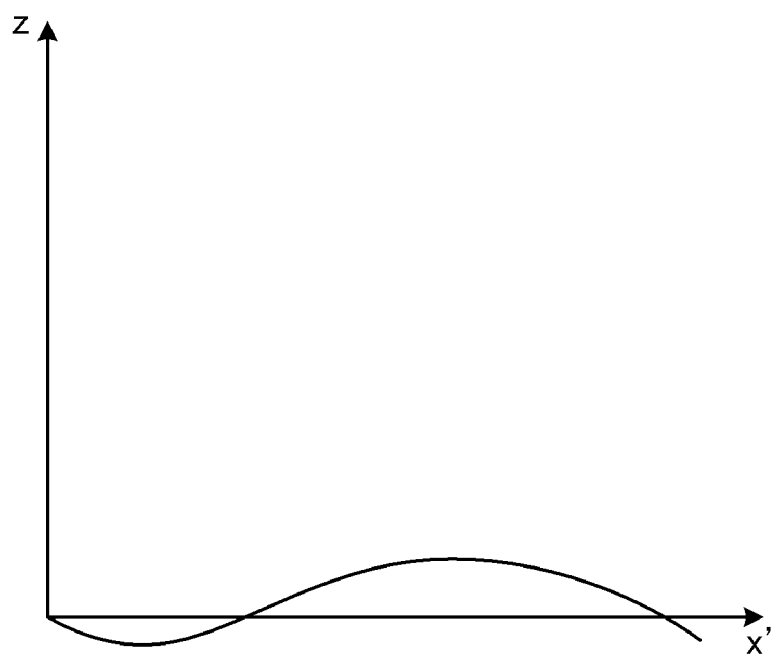
Figure 12:
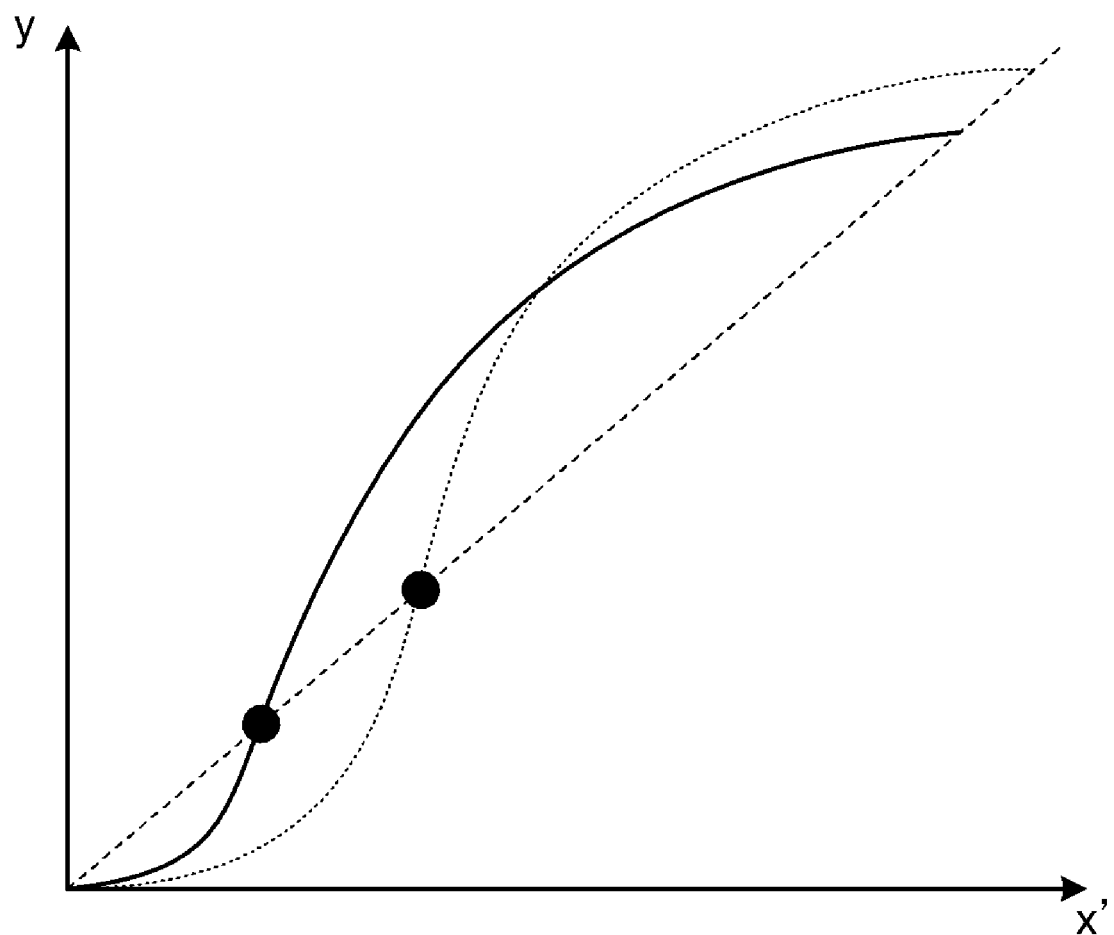
FIG. 12 is a graph that illustrates an example of calculation of a correction curve line.

For example, as illustrated in FIG. 10A, a correction curve line is previously stored and, if the degree of curvature of the correction curve line is "Z", the relation between the degree of curvature "Z" and the horizontal axis "X (the pixel value of the input pixel)" is obtained as illustrated in FIG. 10B. In this case, as used in the first embodiment, a new variable "X1" is prepared that, as illustrated in FIG. 11A, is related to the pixel value "X" of the input image by an exponent function. If the relation between the degree of curvature "Z" and the output pixel value "X1" is represented, the relation illustrated in FIG. 11B is present such that the point where "X" and the function intersect with each other when the relation between the degree of curvature "Z" and the pixel value "X" of the input image is represented is shifted. If the new variable "X1" is the pixel value "X1" of the input pixel, the relation between the pixel value "X1" and the pixel value "Y" of the output pixel is represented as illustrated in FIG. 12 so that a new correction curve with the inflection point shifted can be calculated. Specifically, for example, a plurality of new variables "X1" is prepared, the new variable "X1" suitable for the feature value of the input image is acquired, and the degree of curvature "Z" and the correction curve line are calculated by using the acquired new variable "X1" so that, as a result, the correction curve with the inflection point suitable for the input image can be calculated. FIGS. 10A, 10B, 11A, 11B, and 12 are graphs that illustrate an example of the calculation of a correction curve line.

[c] Third Embodiment

Although the embodiments of the present invention are explained above, the present invention can be implemented in various different embodiments other than the above-described embodiments. Different embodiments are described below in separate sections, i.e., (1) correction process, (2) system configuration, and the like, and (3) programs.

(1) Correction Process

For example, although an explanation is given in the first embodiment for the case where the correction curve is calculated for every 10 frames and, between these frames, the contrast correction is performed by using the correction curve that has undergone an interpolation process, the present invention is not limited thereto and the contrast correction can be performed by calculating the correction curve each time for each input image.

In such a case, the correcting unit 17 may be directly connected to the correction curve DB 13, or the correction curve acquired from the correction curve DB 13 may be output to the correcting unit 17 without being interpolated by the interpolating unit 16. Although an explanation is given for the case where the correction curve is calculated for every 10 frames as an example of performing the interpolation process, the present invention is not limited thereto, and a new correction curve may be calculated if the difference between the average lightness of the current input image and the average lightness of the previous input image is large, or if a sea change occurs.

(2) System Configuration, etc.

Among the processes described in the embodiments, all or part of the processes (for example, the process for receiving an input image) that are automatically performed as described above can be performed manually. Furthermore, operating procedures, control procedures, specific names, and various types of information (for example, in FIGS. 4, 5A, 5B, 6A, 6B, 7A and 7B) including data and parameters as described in the above specifications and the drawings can be optionally changed except as otherwise noted.

Each of the components of the apparatuses illustrated in the drawings is based on a functional concept and does not necessarily need to be physically configured as illustrated in the drawings. That is, specific forms of disintegration and integration of each of the apparatuses are not limited to the ones illustrated in the drawings, and all or some of the apparatuses can be configured by being functionally or physically disintegrated or integrated in an arbitrary unit depending on various loads or usage (for example, the interpolating unit and the correcting unit can be integrated). All or any of the processing functions performed by each of the apparatuses can be implemented by a CPU and programs analyzed and executed by the CPU or implemented as wired logic hardware.

(3) Programs

Various processes described in the above embodiments can be performed by executing prepared programs using a computer system such as a personal computer or a workstation. An explanation is given below of, as another embodiment, a computer system that executes programs that have the same functions as those described in the above embodiments.

Figure 13:
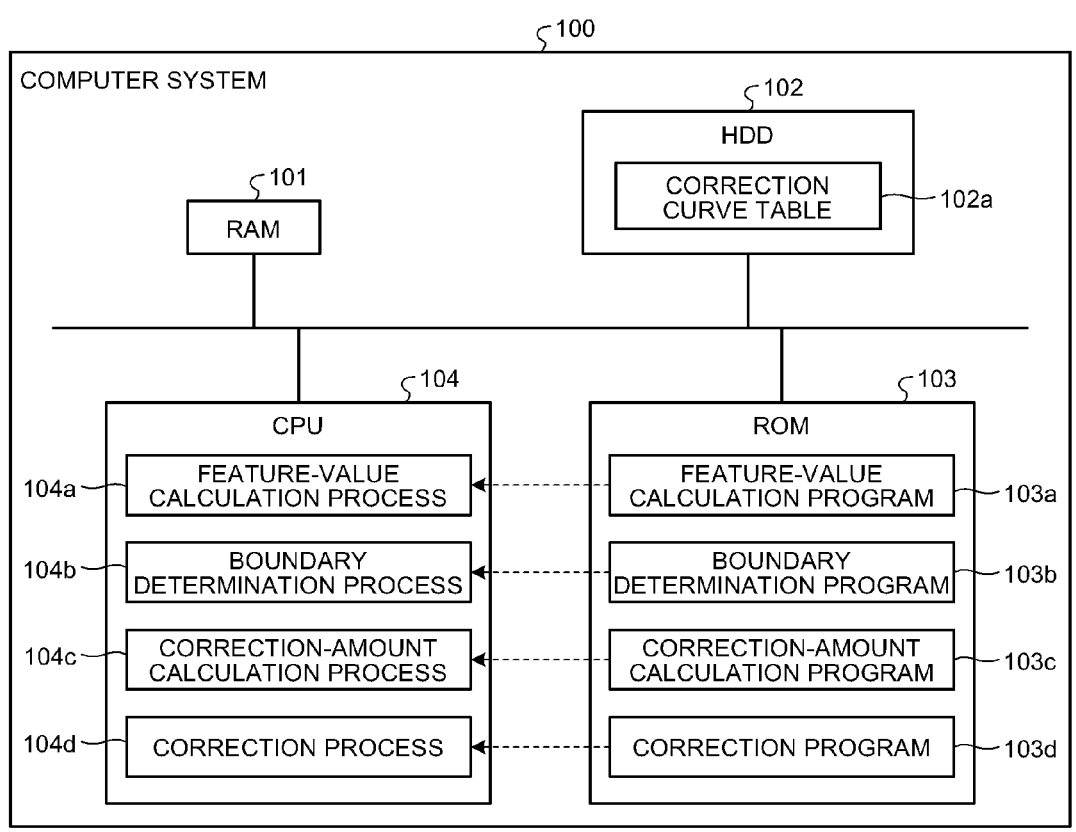
FIG. 13 is a diagram that illustrates an example of a computer system that executes an image correction program.
Figure 14A:
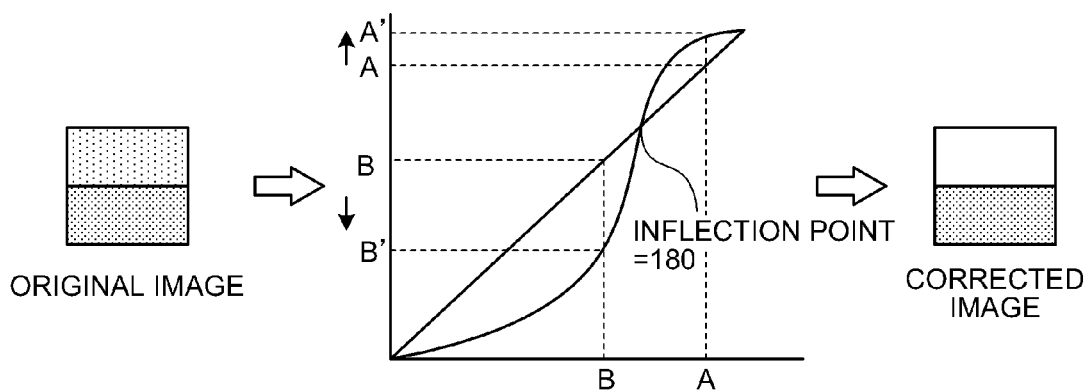
FIGS. 14A and 14B are diagrams that explain a conventional technology.
Figure 14B:
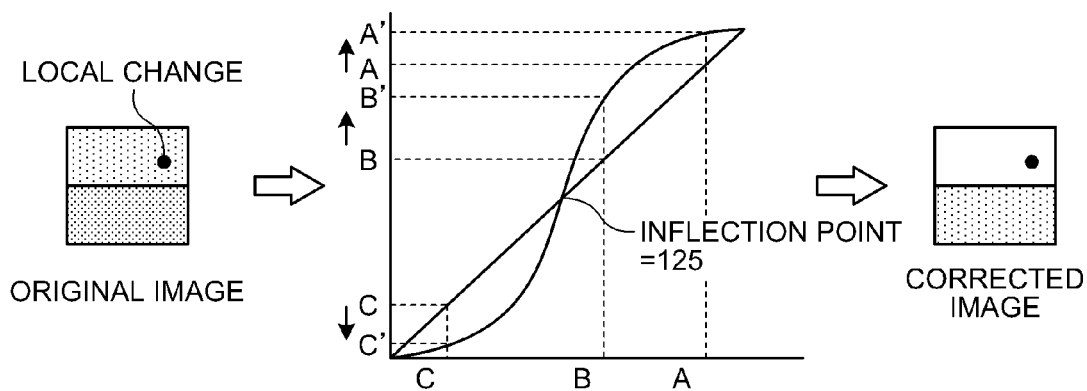

FIG. 13 is a diagram that illustrates an example of a computer system that executes an image correction program. As illustrated in FIG. 13, a computer system 100 is constituted by a RAM 101, an HDD 102, a ROM 103, and a CPU 104. The ROM 103 previously stores therein programs that perform the same functions as those described in the above embodiments, i.e., a feature-value calculation program 103a, a boundary determination program 103b, a correction-amount calculation program 103c, and a correction program 103d, as illustrated in FIG. 13.

The CPU 104 reads the programs 103a to 103d and executes the read programs 103a to 103d, thereby implementing a feature-value calculation process 104a, a boundary determination process 104b, a correction-amount calculation process 104c, and a correction process 104d, as illustrated in FIG. 13. The feature-value calculation process 104a corresponds to the feature-value calculating unit 15a illustrated in FIG. 2, the boundary determination process 104b similarly corresponds to the boundary determining unit 15b, the correction-amount calculation process 104c corresponds to the correction-amount calculating unit 15c, and the correction process 104d corresponds to the interpolating unit 16 and the correcting unit 17.

The HDD 102 is provided with a correction curve table 102a that stores therein an area for determining a contrast correction amount for an input image. The correction curve table 102a corresponds to the correction curve DB 13 illustrated in FIG. 2.

The above programs 103a to 103d do not necessarily need to be stored in the ROM 103 and, for example, the programs 103a to 103d may be stored in a "portable physical medium", such as a flexible disk (FD), a CD-ROM, an MO disk, a DVD, a magneto optical disk, or an IC card, to be inserted into the computer system 100, a "fixed physical medium", such as a hard disk drive (HDD), arranged inside or outside of the computer system 100, or a "different computer system" coupled to the computer system 100 via a public line, the Internet, a LAN, a WAN, or the like, and the computer system 100 may read the programs 103a to 103d from them and execute them.

According to an embodiment, contrast correction can be performed with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image correction apparatus comprising:
    a feature-value calculating unit that calculates a feature value indicative of average brightness of an input image from pixel values of pixels of the input image;
    a boundary determining unit that determines a pixel value at a boundary for correcting each pixel of the input image to make the pixel brighter or darker by using the feature value of the input image calculated by the feature-value calculating unit; and
    a correction-amount calculating unit that calculates, with respect to the pixel value of each pixel of the input image, an area for determining a contrast correction amount for a pixel value smaller than the pixel value at the boundary determined by the boundary determining unit such that a pixel is to be made darker, and an area for determining a contrast correction amount for a pixel value larger than the pixel value at the boundary determined by the boundary determining unit such that a pixel is to be made brighter, wherein
    the feature-value calculating unit calculates an average lightness or a mode as the feature value indicative of the average brightness of the input image from the pixel value of each pixel of the input image,
    the boundary determining unit determines an inflection point of a correction curve line as the pixel value at the boundary for correcting each pixel of the input image to make the pixel brighter or darker by using the average lightness or the mode of the input image calculated by the feature-value calculating unit, and
    the correction-amount calculating unit calculates, with respect to the pixel value of each pixel of the input image, a correction curve line as an area for determining a contrast correction amount for a pixel value that is below the inflection point at the boundary determined by the boundary determining unit such that a pixel is to be made darker and for a pixel value that is above the inflection point at the boundary determined by the boundary determining unit such that a pixel is to be made brighter.

2. The image correction apparatus according to claim 1, wherein the boundary determining unit determines, if the average lightness or the mode of the input image calculated by the feature-value calculating unit is equal to or less than a first threshold, the first threshold as the inflection point,
    the boundary determining unit determines, if the average lightness or the mode is larger than the first threshold and smaller than a second threshold, the average lightness or the mode as the inflection point, and
    the boundary determining unit determines, if the average lightness or the mode is equal to or more than the second threshold, the second threshold as the inflection point.

3. The image correction apparatus according to claim 1, wherein the correction-amount calculating unit further calculates a variance of the input image,
    the correction-amount calculating unit calculates, if the calculated variance is large, a correction curve line with a large degree of curvature, and
    the correction-amount calculating unit calculates, if the calculated variance is small, a correction curve line with a small degree of curvature.

4. The image correction apparatus according to claim 1, further comprising a correcting unit that determines a contrast correction amount corresponding to each pixel of the input image by using the correction curve line calculated by the correction-amount calculating unit and corrects each pixel by using the determined contrast correction amount.

5. A non-transitory computer readable storage medium having stored therein an image correction program causing a computer to execute a process comprising:
- calculating a feature value indicative of average brightness of an input image from pixel values of pixels of the input image;
- determining a pixel value at a boundary for correcting each pixel of the input image to make the pixel brighter or darker by using the calculated feature value of the input image; and
- calculating, with respect to the pixel value of each pixel of the input image, an area for determining a contrast correction amount for a pixel value smaller than the pixel value at the boundary determined at the determining such that a pixel is to be made darker, and an area for determining a contrast correction amount for a pixel value larger than the pixel value at the boundary determined at the determining such that a pixel is to be made brighter, wherein
- the calculating the feature value includes calculating an average lightness or a mode as the feature value indicative of the average brightness of the input image from the pixel value of each pixel of the input image,
- the determining includes determining an inflection point of a correction curve line as the pixel value at the boundary for correcting each pixel of the input image to make the pixel brighter or darker by using the calculated average lightness or the calculated mode of the input image, and
- the calculating the areas includes calculating, with respect to the pixel value of each pixel of the input image, a correction curve line as an area for determining a contrast correction amount for a pixel value that is below the inflection point at the boundary determined at the determining such that a pixel is to be made darker and for a pixel value that is above the inflection point at the boundary determined at the determining such that a pixel is to be made brighter.

6. The non-transitory computer readable storage medium according to claim 5, wherein the determining includes
- determining, if the calculated average lightness or the calculated mode of the input image is equal to or less than a first threshold, the first threshold as the inflection point,
- determining, if the average lightness or the mode is larger than the first threshold and smaller than a second threshold, the average lightness or the mode as the inflection point, and
- determining, if the average lightness or the mode is equal to or more than the second threshold, the second threshold as the inflection point.

7. The non-transitory computer readable storage medium according to claim 5, wherein the calculating the areas further includes
- calculating a variance of the input image,
- calculating, if the calculated variance is large, a correction curve line with a large degree of curvature, and
- calculating, if the calculated variance is small, a correction curve line with a small degree of curvature.

8. The non-transitory computer readable storage medium according to claim 5, wherein the process further comprises:
- determining a contrast correction amount corresponding to each pixel of the input image by using the calculated correction curve line; and
- correcting each pixel by using the determined contrast correction amount.

9. An image correction method comprising:
- calculating a feature value indicative of average brightness of an input image from pixel values of pixels of the input image;
- determining a pixel value at a boundary for correcting each pixel of the input image to make the pixel brighter or darker by using the calculated feature value of the input image; and
- calculating, with respect to the pixel value of each pixel of the input image, an area for determining a contrast correction amount for a pixel value smaller than the pixel value at the boundary determined at the determining such that a pixel is to be made darker, and an area for determining a contrast correction amount for a pixel value larger than the pixel value at the boundary determined at the determining such that a pixel is to be made brighter, wherein
- the calculating the feature value includes calculating an average lightness or a mode as the feature value indicative of the average brightness of the input image from the pixel value of each pixel of the input image,
- the determining includes determining an inflection point of a correction curve line as the pixel value at the boundary for correcting each pixel of the input image to make the pixel brighter or darker by using the calculated average lightness or the calculated mode of the input image, and
- the calculating the areas includes calculating, with respect to the pixel value of each pixel of the input image, a correction curve line as an area for determining a contrast correction amount for a pixel value that is below the inflection point at the boundary determined at the determining such that a pixel is to be made darker and for a pixel value that is above the inflection point at the boundary determined at the determining such that a pixel is to be made brighter.

10. The image correction method according to claim 9, wherein the determining includes
- determining, if the calculated average lightness or the calculated mode of the input image is equal to or less than a first threshold, the first threshold as the inflection point,
- determining, if the average lightness or the mode is larger than the first threshold and smaller than a second threshold, the average lightness or the mode as the inflection point, and
- determining, if the average lightness or the mode is equal to or more than the second threshold, the second threshold as the inflection point.

11. The image correction method according to claim 9, wherein the calculating the areas further includes
- calculating a variance of the input image,
- calculating, if the calculated variance is large, a correction curve line with a large degree of curvature, and
- calculating, if the calculated variance is small, a correction curve line with a small degree of curvature.

12. The image correction method according to claim 9, further comprising:
- determining a contrast correction amount corresponding to each pixel of the input image by using the calculated correction curve line; and
- correcting each pixel by using the determined contrast correction amount.

* * * * *